S. METZLER.
BELT FASTENER.
No. 32,637. Patented June 25, 1861.
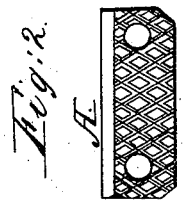
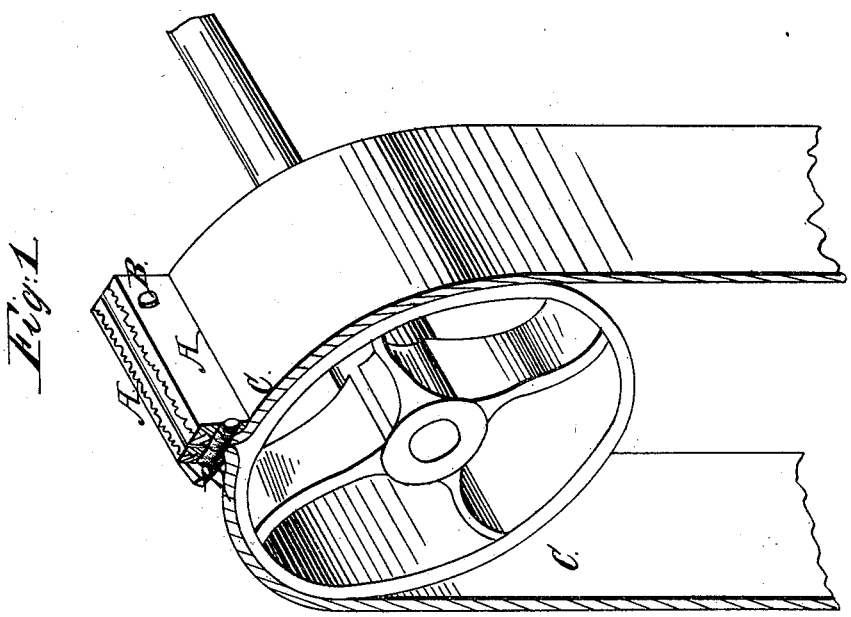

UNITED STATES PATENT OFFICE.

SAMUEL METZLER, OF NAPERVILLE, ILLINOIS.

BELT-COUPLING.

Specification of Letters Patent No. 32,637, dated July 25, 1861.

*To all whom it may concern:*

Be it known that I, SAMUEL METZLER, of Naperville, in the county of Dupage and State of Illinois, have invented a new and useful Improvement in Belt-Couplings; and I do hereby declare that the following is a full, clear, and exact description of the same, reference being had to the accompanying drawings, forming a part of this specification, in which—

Figure 1, represents a sectional perspective view of my invention, and Fig. 2, a detached view of one of the plates.

Similar letters of reference in each of the two figures indicate carresponding parts.

The nature of my invention consists in the combination with the ends of a pulley belt, of two metal plates and a series of screw bolts—the said ends of the belt being bent up at right angles to that part of the belt which passes around the pulley—and the said plates being rounded at their lower-inner-corner and serrated on their inner faces—and the said screw bolts passing through holes cut through the plates and the belt—all as hereinafter described and shown.

To enable others to make and use my invention, I will proceed to describe its construction.

A, A, represent the plates; said plates have their inner surfaces roughened, as shown in Fig. 2, and are each perforated with two or more holes, which serve to admit the screws or rivets B, B, for holding them together.

C, represents a belt, the ends of which are turned up and confined together between the plates A, A. The bolts or rivets are then passed through said ends, as shown in Fig. 1.

In many of the metal belt fastenings at present in use, it will be observed that at every revolution of the belt the metal will strike the pulley, thus wearing the surface of the same and causing a decrease in the friction surface of the belt. The belt will also wear out first at the place where the ends are secured together. With my fastening the belt will last as long at that place as at any other, and the fastening, being on the top surface of the belt, will not touch the pulley.

By my improvement the operation of shortening and lengthening a belt is greatly facilitated, thereby giving it a decided advantage over all other fastenings in use; all the manipulation necessary in shortening the belt being to remove the plates farther from the ends of the belts and make new holes in the belt to allow the screws or rivets to come through.

I am aware that the ends of a belt have been connected together by means of slots and detachable shouldered plates in such a manner that the contact between the pulley and the plates is obviated. Therefore I do not claim broadly the principle involved in such mode of connecting the ends of belts together, but What I do claim as my invention and desire to secure by Letters Patent, is—

The combination with the ends of a pulley belt C of the two metal plates A, A, and the screw bolts B, B, the said parts being constructed and applied in the manner and for the purpose herein described.

SAMUEL METZLER.

Witnesses:
JAS. G. WRIGHT,
R. D. BRANCH.